Feb. 25, 1969

W. B. EASTON 3,429,271

GEAR REDUCTION DRIVE MECHANISM FOR ROTARY
FLUID PRESSURE DEVICES OR THE LIKE

Filed July 31, 1967

INVENTOR.
WAYNE B. EASTON

United States Patent Office 3,429,271
Patented Feb. 25, 1969

3,429,271
GEAR REDUCTION DRIVE MECHANISM FOR ROTARY FLUID PRESSURE DEVICES OR THE LIKE
Wayne B. Easton, Eden Prairie, Minn.
(400 Dain Tower, Minneapolis, Minn. 55402)
Filed July 31, 1967, Ser. No. 657,106
U.S. Cl. 103—130    9 Claims
Int. Cl. F04c 1/06

ABSTRACT OF THE DISCLOSURE

The invention relates to a drive mechanism for use with or incorporation into a gear reduction set known in the art as a gerotor. A gerotor in this invention comprises an internally toothed ring member and a cooperating externally toothed star member with one of said members having orbital and rotational movement relative to the other member. In some devices it is desired to transmit only the rotational movement of either the star member or the ring member to a rotatable member such as a drive shaft or a valve associated with the gerotor. The drive mechanism of this invention comprises novel male and female drive means between the gerotor member which orbits and rotates the rotatable valve or drive shaft member to effect synchronous rotatable movement of these two members.

---

This invention relates to a drive mechanism which has general utility for use with or incorporation into a gear reduction set known in the art as a gerotor.

Gerotors are commonly used as the chamber forming and contracting means in fluid pressure devices such as motors, pumps and other related devices such as meters. A gerotor comprises an internally toothed ring member and a cooperating externally toothed star member having at least one fewer teeth than the ring member. The star member is disposed eccentrically relative to the ring member and, when one of the gerotor members is fixed, or its axis is fixed relative to the frame or casing in which the gerotor is installed, the other gerotor member may have rotational movement about its own axis and orbital movement about the axis of the first referred to gerotor member. It is a characteristic of a gerotor that the orbital movement of the moveable gerotor member is in the opposite direction from its relative rotational movement and the orbiting speed is several times faster than the relative rotating speed.

In some devices in which a gerotor is utilized there is present a rotatable member such as a valve or a drive shaft which is required to rotate in synchronism with the rotating movement of the moveable gerotor member. This connection between the moveable gerotor member and such a rotatable member has always been troublesome because the connections previously devised have been expensive to manufacture and subject to excessive wear and premature mechanical failures. The apparent difficulty with prior art connections is that they either involve wobble shafts with specially formed gear teeth which are expensive to manufacture or other costly or unsatisfactory gearing and coupling arrangements devised to accommodate the orbiting motion of the star or ring member.

The drive mechanism of the present invention comprises novel male and female drive elements between a moveable gerotor member and a member such as a valve or a drive shaft which is to be rotated in synchronism with the rotational movement of the gerotor member. Advantages of this new and improved drive mechanism are that it is substantially more simple than the conventional wobble shaft, gearing and coupling arrangements, is inexpensive to manufacture, and facilitates trouble-free and reliable operation.

It is a main object of the invention to provide a new and improved gerotor drive mechanism having the features and advantages referred to above.

Other objects and advantages of the invention will become apparent from the following specification, appended claims and attached drawing.

Figure 1:
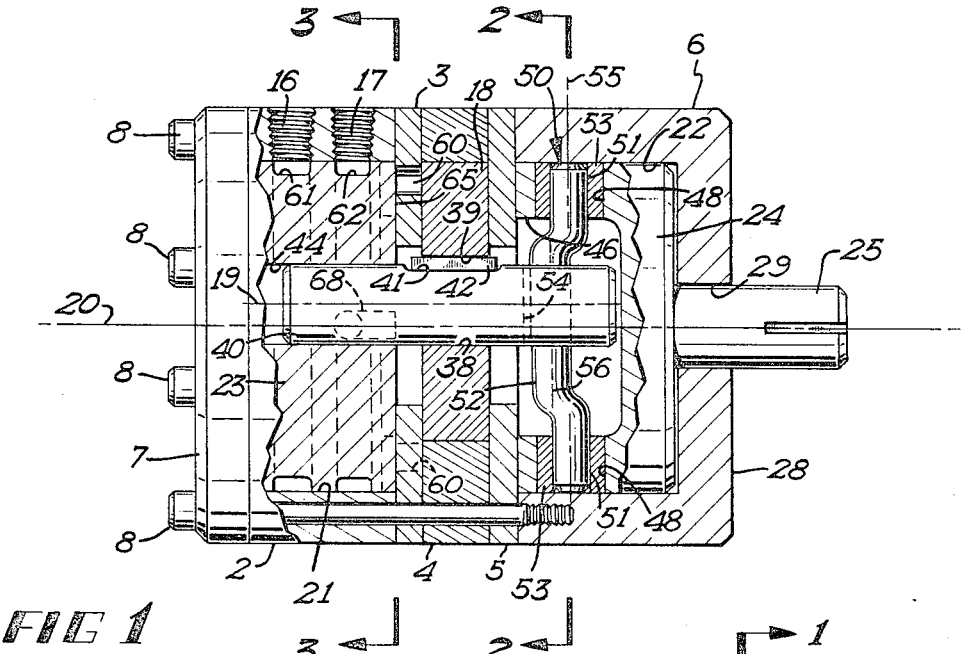
Figure 2:
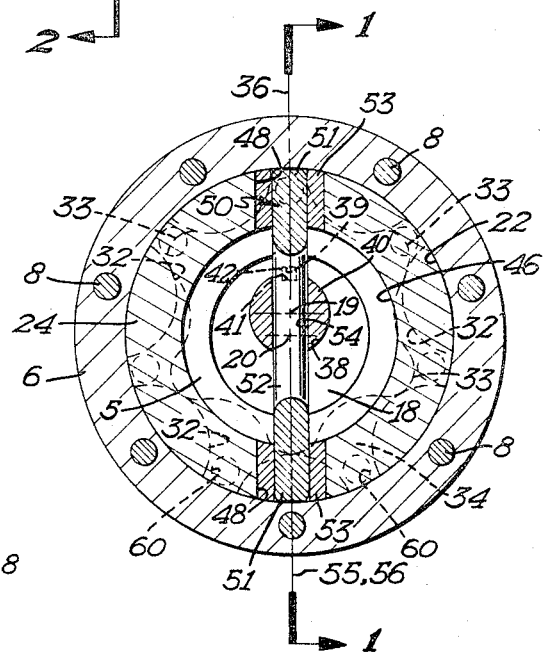
Figure 3:
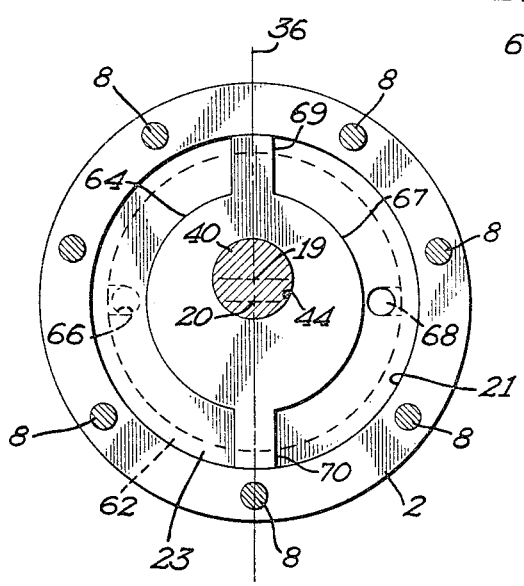

In the drawing:
FIG. 1 is a longitudinal sectional view of a fluid pressure operated motor or pump embodying a new and improved drive mechanism taken on line 1—1 of FIG. 2;
FIG. 2 is a transverse sectional view taken on line 2—2 of FIG. 1; and
FIG. 3 is a transverse sectional view taken on line 3—3 of FIG. 1.

The invention is illustrated herein as being embodied in a fluid pressure device which is operable as a pump or a motor.

In the fluid pressure motor or pump illustrated there is provided a casing or housing made of several annularly and cylindrically shaped sections which are, in sequence, a valve casing section 2, a valve plate section 3, a gerotor casing section 4, a plate section 5, and a drive shaft housing section 6. An end plate 7 is provided for attachment to valve section 2 and all of the casing sections 2 to 7 are held together in axial alignment by a plurality of circumferentially spaced bolts 8.

Casing section 2 is provided with inlet and outlet ports 16 and 17 which would be reversed for operation of the pump or motor in the opposite direction.

The shape of gerotor casing section 4 is generally cylindrical and annular and has a plurality of internal teeth. An externally toothed star member 18 having at least one fewer teeth than casing section 4, which may be referred to as a ring member 4, has the teeth thereof in meshing engagement with the teeth of ring member 4. Star member 18 has a hypocycloidal movement and the axis 19 thereof travels in a circular orbit about the axis 20 of ring member 4.

Casing sections 2 and 6 have generally cylindrical external shapes and have respective axially extending bores 21 and 22 which are concentric relative to the axis 20 of ring member 4. Inlet and outlet ports 16 and 17 communicate with the interior of bore 21 as shown in FIG. 1. Journalled in valve casing section 2 in circumferential slidable engagement with bore 21 and axial slidable engagement with valve plate 3 is a cylindrically shaped valve 23. Rotatably journalled in casing section 6 is a cylindrically shaped drive shaft collar 24 of a drive shaft 25 which is in circumferential slidable engagement with the casing bore 22 and axial sliding engagement with casing plate 5. Casing section 6 has an annular end wall portion 28 having a bore 29 concentric relative to ring axis 20 through which drive shaft 25 extends.

With reference to FIG. 2, the gerotor casing section 4, which in effect is the ring member 4, has a plurality of internal teeth 32. Externally toothed star member 18, having at least one fewer teeth 33 than ring member 4, is disposed eccentrically in the chamber or space formed and surrounded by ring member 4. Star member 18 is moveable orbitally relative to the ring member 4 with the axis 19 of star member 18 being moveable in a circular orbital path about the axis 20 of ring member 4. During orbital movement of star member 18 the teeth 33 thereof intermesh with the ring member teeth 32 in sealing engagement to form expanding and contracting chambers 34 which are equal in number to the number of teeth 32 of ring member 18.

With reference to FIGS. 2 and 3, a vertical centerline or plane 36 represents the plane of eccentricity for the star member 18 for that particular position of the star member relative to the ring member 4. The plane of eccentricity 36 in effect rotates about ring axis 20 during relative movement between the ring and star members 4 and 18 at the orbital speed of the star member 18. Star axis 19 is in the plane 36 for all positions of the star member 18 relative to the ring member 4 and at any instant the position of the plane 36 indicates the eccentric position of the star member relative to the ring member. During orbital movement of the star member 18, and assuming the orbital movement is clockwise, as viewed in FIG. 2, the chambers 34 on the right side of the plane of eccentricity would be contracting and the chambers 34 on the left side would be expanding. If the device is used as a motor whereby torque is transmitted from star 18 to drive shaft 25, fluid under pressure is directed to the expanding chambers and exhausted from the contracting chambers. If the device is used as a pump whereby torque is transmitted from drive shaft 25 to star 18, fluid is drawn into the expanding chambers and delivered under pressure from the contracting chambers.

Star 18 is illustrated as having a central bore 38 coaxial with star axis 19 and an axially extending keyway slot 39. A cylindrically shaped shaft 40 having the same effective diameter as star bore 38 is disposed in star bore 38, the length of shaft 40 being sufficient so that it extends axially from both sides of the star 18. Shaft 40 is fixedly attached to star 18 and this is effected by providing a keyway slot 41 in shaft 40 which complements star keyway slot 39 and by providing a key 42 which is inserted in the keyway defined by the slots 39 and 41. Shaft 40, being fixedly attached to star 18, both orbits and rotates with the star 18 about the axes 20 and 19, respectively.

Valve 23 has an axially extending bore 44 having an axis which is eccentric relative to ring axis 20 a distance equal to the eccentricity of star axis 19 relative to ring axis 20. Shaft 40 is journalled in valve bore 44 for relative sliding engagement therewith and has the same effective diameter as valve bore 44. When shaft 40 is disposed in valve bore 44, the axis of valve bore 44 is colinear with the axis 19 of star 18.

Drive shaft collar 24 has an axially extending bore 46 having an axis which is generally concentric relative to ring axis 20 and has a diameter which is not of critical size except that it must be large enough to accommodate the driving connection between shaft 40 and drive collar 24 as will be explained further on. Drive shaft collar 24 has a transversely and diametrically extending bore 48 formed in two parts on opposite sides of the collar bore 46. A crank 50 is provided having cylindrically shaped and axially aligned end portions 51 journalled in drive collar 24. Between crank end portions 51 is a cylindrically shaped eccentrically offset portion 52. Bores 48 are large enough to allow crank 50 to be inserted to its illustrated position and crank 50 is journalled for rotational or pivotal movement in such position by a pair of annularly shaped bearings 53 which are press fitted into the drive collar bores 48.

Shaft 40 is provided with a slot 54 having substantially the same width as the diameter of crank portion 52 for receiving crank portion 52 in torque transmitting relation as illustrated. Crank 50 has a main diametrically extending axis 55 and the cylindrically shaped offset portion 52 has a geometric axis 56 which is spaced from the main crank axis 55 a distance which is equal to or greater than the distance between star and ring axes 19 and 20. In operation, if the distance between crank axes 55 and 56 is greater than the distance between axes 19 and 20 there will be, concomitant with the rotation of shaft 25, an oscillatory pivotal movement of crank offset portion 52 relative to axis 55. If the distance between crank axes 55 and 56 is equal to the distance between axes 19 and 20 there will be an orbital movement of crank portion 52 relative to axis 55 and a rotary movement of crank portions 51 relative to axis 55. In either case, regardless of the distance between axes 55 and 56, there is present in operation a periodic relative sliding movement between shaft 40 and crank offset portion 52 having a displacement equal to twice the eccentric distance between star and ring axes 19 and 20. When the distance between axes 55 and 56 is greater than the distance between axes 19 and 20 crank 50 may, alternatively, be displaced 180 degrees about axis 55 from the position illustrated if desired.

In operation a star member 18 having six teeth will make one revolution about its own axis 19 for every six times the star member orbits in the opposite direction about the axis 20 of the ring member 4. In effect, the shaft 40 has both orbital and rotational movement in common with star 18. It is only the rotational movement of star 18 that is transmitted to drive collar 24 through crank ends 51, however, because the above mentioned pivotal or orbital movement of crank portion 52 and the above mentioned sliding movement between shaft 40 and crank portion 52 fully accommodate the orbital movement of star 18 and only permits the rotational movement of the star 18 to be transmitted to the drive collar 24. The illustrated connection between shaft 40 and crank 50 thus facilitates or effects the rotation of drive collar 24 in synchronism with and at the same speed as the rotational movement of star 18.

In the position of the star 18 shown in FIG. 2 the axis 56 of crank portion 52 intersects ring axis 20. As star 18 orbits and rotates, however, crank axis 56 will be periodically displaced relative to ring axis 20 a distance equal to the distance between axes 19 and 20. In the illustrated embodiment of the invention, with a 7 to 6 ratio between the teeth of the ring and star elements, crank portion 52 will have seven orbital or pivotal oscillation cycles for each complete rotation of the star 18 relative to the ring 4. The orbital or pivotal oscillation cycles involve the lateral moving of crank axis 56 so as to periodically intersect ring axis 20 and moving a distance away from axis 20 a distance equal to the distance between axes 19 and 20 each time after having intersected axis 20.

An obvious reversal of parts would be a construction in which crank 50 would be axially moveable relative to the crank axis 55 thereof with crank end portions 51 being axially slidable in and relative to the bearings 53. With this reversal of parts, collars or the like would be fixedly attached to crank portion 52 on opposite sides of and in abutting engagement with shaft 40 so that, instead of there being relative movement between shaft 40 and crank portion 50 in the direction of axis 56 as illustrated, the orbital movement of the shaft 40 would be in synchronism with a reciprocal movement of the crank relative to the bearings 53. The orbital or pivotal movement of crank portion 52 relative to crank axis 55, as described in connection with the illustrated embodiment of the invention, would not be changed or altered by this reversal of parts.

With regard to other modifications within the scope of the invention, a reversal of parts in different forms is contemplated such as having a fixed or rotating star in combination with a rotating and orbiting ring. Another obvious reversal would be to associate the shaft 40 with the rotatable member 24 and associate the crank 50 with the orbiting and rotating element of a gerotor whether it be the star or the ring of the gerotor. More generally, the invention may be broadly characterized as comprising male and female drive elements associated with a gerotor and an element to be rotated at a relatively slow speed such as a valve or a drive shaft wherein (1) the male element is elongated and extends tranversely relative to the fixed axis 20, (2) the male and female elements move together laterally relative to the fixed axis 20, (3) the male element is restrained from moving relative to the axis of the member to which it is attached, such as the axis 20 of the rotatable member 24, in the direction of elongation of the male element, and (4) there is relative sliding movement between the male and female elements in the direction of the elongation of the male element with the total relative displacement being equal to twice the distance between axes 19 and 20.

Further with regard to modifications, it is contemplated that the scope of the invention includes constructions in which a straight pin or shaft (not shown) is substituted for the crank 50 and means are provided to permit the straight pin or shaft to simulate the movements of the crank midportion 52. Such means, for example, might be (1) a lost motion connection between one or both ends of the straight pin and the rotatable member 24 or (2) a lost motion of some kind of a resilient connection between shaft 40 and the straight pin.

It will also be understood that the invention may also be accomplished by omitting the shaft 40 and simply providing a slot in the star 18. With that construction the crank portion 52 would be offset from crank axis 55 a greater distance than illustrated so that crank portion 52 would actually be within the lateral confines of the star 18. The length of crank portion 52 could be made shorter than illustrated and the slot in the star would have to be longer than the length of crank portion 52, in the direction of elongation of crank portion 52, to permit relative movement therebetween in that direction. The slot or other female means for accommodating crank 50 may thus be formed directly in the star 18 and be integral therewith.

Referring further to the illustrated embodiment of the invention, valve 23 and casing sections 2 and 3 are provided with fluid passages in a known manner through which fluid is conveyed from the port 16 or 17 to expanding chambers 34 of the gerotor and returned from contracting gerotor chambers to the other of the ports 16 or 17. Port 16 or 17 will be the inlet, and the other the outlet port, depending on the direction of rotation desired for drive shaft 25. During orbiting of star 18 about ring member axis 20, the star rotates in the opposite direction about its own axis 20 at a slower speed. The ratio between the orbiting and rotating speeds is dependent upon the ratio between the ring and star member teeth. If that ratio is seven to six as illustrated herein the rotating speed of the star will be one-sixth of its orbiting speed. By reason of the shaft connection between star 18 and valve 23, valve 23 rotates at the same speed and in the same direction as the orbiting direction of the star. Valve 23 is of the high speed type and functions to supply and exhaust fluid to and from the gerotor at the orbiting frequency of the star.

Referring further to the fluid passage arrangement, valve plate 3 is provided with a set of circumferentially arranged, axially extending passages 60 which extend from casing bore 21 to the respective junctions between the ring member teeth 32 for supplying and exhausting fluid to and from the gerotor chambers 34. Valve 23 has two axially spaced annular channels 61 and 62 which are axially aligned with ports 16 and 17 and in respective fluid communication therewith. Assuming for purposes of illustration that port 16 is the inlet port, valve 23 has a fluid feeding passage 64 which is illustrated as an arc shaped recess in the end face 65 of valve 23 on one side of the plane of eccentricity 36 and which is connected to the annular channel 61 and the inlet port 16 through passage 66 in valve 23. Valve 23 also has a fluid exhausting passage 67 which is illustrated as an arc shaped recess in the end face 65 of valve 23, on the opposite side of the valve 23 and the plane of eccentricity 36, which is connected to the annular channel 62 and the outlet port 17 through a passage 68 in the valve 23. Fluid feeding and exhausting passages 64 and 67 are separated along the plane of eccentricity 36 by lands 69 and 70.

Upon rotation of valve 23, fluid feeding passage 64 and fluid exhausting passage 67 successively register in fluid communication with valve plate passages 60. If the fluid pressure device is functioning as a motor or a pump, fluid may be introduced through port 16 from where it would flow into annular channel 61 of valve 23, through passage 66 to fluid feeding passage 64 and through certain of the valve plate passages 60 to the expanding chambers 34. At the same time, fluid from the contracting chambers 34 flows through other valve plate passages 60 to the fluid exhausting passage 67 of valve 23, through valve passage 68 to the annular channel 67 and out the outlet port 17.

If desired, as a modification, valve plate 3 could be omitted in which case the fluid feeding and exhausting passages 64 and 67 of valve 23 would have direct fluid communication with the expanding and contracting chambers 34 of the gerotor. With that type of construction the valve lands 69 and 70 would have to be of sufficient circumferential width so that short circuiting of the fluid between the expanding and contracting chambers 34 would be avoided.

While one embodiment of the invention is described herein, it will be understood that it is capable of modifications, and that such modifications, including a reversal of parts, may be made without departing from the spirit and scope of the invention as defined in the claims.

What I claim is:

1. A gear reduction drive mechanism comprising, a frame or casing, an internally toothed ring gear having an axis, a cooperating externally toothed star gear having fewer teeth than said ring gear and having an axis which is displaced an eccentric distance relative to the axis of said ring gear, one of said gears having an axis which is fixed relative to said frame and the other of said gears being a moveable gear member capable of rotational movement about its own axis in one direction and orbital movement about said fixed axis in the other direction, a rotatable member mounted in said frame for rotation about said fixed axis, engaging male and female drive elements associated respectively with said members for respective rotation with said members, said male element having an elongated portion extending in a transverse direction relative to said axis associated with the one of said members to which it is connected, said elongated portion being laterally moveable relative to said associated axis and being restrained from movement relative to said associated axis in the direction of its elongation, said male and female parts being slidably displaceable relative to each other in transverse directions relative to said fixed axis a distance equal to at least twice said eccentric distance.

2. A gear reduction drive mechanism according to claim 1 wherein said male drive element is associated with said rotatable member and said female drive element is associated with said moveable gear member.

3. A gear reduction drive mechanism according to claim 1 wherein said female drive element comprises a slot and said male drive element comprises a shaft portion slidably disposed in said slot.

4. A gear reduction drive mechanism according to claim 1 wherein said female drive element comprises a shaft attached to one of said members and said male drive element comprises a crank having opposite ends thereof journalled in the other of said members, said elongated portion being disposed between and eccentrically offset from said opposite ends of said crank a distance at least equal to said eccentric distance.

5. A gear reduction mechanism according to claim 4 wherein said crank is positioned so that said elongated portion thereof is offset from said opposite ends in the direction of said gears.

6. A gear reduction drive mechanism according to claim 1 wherein said moveable gear member is said star gear.

7. A gear reduction drive mechanism comprising, a frame or casing, an internally toothed ring gear having an axis, a cooperating externally toothed star gear having fewer teeth than said ring gear and having an axis displaced an eccentric distance relative to the axis of said ring gear, one of said gears having an axis which is fixed relative to said frame and the other of said gears being a moveable gear member having rotational movement about its own axis and orbital movement about said fixed axis, a rotatable member mounted in said casing for rotation about said fixed axis, a crank journalled for angular movement in one of said members with the main axis of said crank intersecting the axis of said one of said members, said crank having an offset portion spaced from said main crank axis a distance at least as great as said eccentric distance, a shaft having a female end portion attached to the other of said members in coaxial relation to the axis thereof, said female end portion of said shaft engaging said offset portion of said crank to effect the synchronous rotation of said members.

8. A gear reduction drive mechanism according to claim 7 wherein said shaft is attached to said star gear member and said crank is associated with said rotatable member.

9. A gear reduction drive mechanism comprising, a frame or casing, an internally toothed ring gear having an axis, a cooperating externally toothed star gear having fewer teeth than said ring gear and having an axis which is displaced an eccentric distance relative to said ring gear, one of said gears having an axis which is fixed relative to said frame and the other of said gears being a moveable gear member having orbital and rotational movement relative to said frame, a rotatable member mounted in said casing for rotation about said fixed axis, drive means between said moveable gear member and said rotatable member to effect substantial synchronous rotation between said moveable gear member and said rotatable member, said drive means being characterized by comprising slidably engaging male and female elements associated respectively with said members, said male and female elements having an elongated portion and a slot respectively which extend transversely relative to the respective axes of said members and which move cyclically together laterally from one side to the other of the axis of said fixed gear.

References Cited

UNITED STATES PATENTS

| | | | |
|---|---|---|---|
| Re. 26,383 | 4/1968 | Huber | 91—56 |
| 560,579 | 5/1896 | Forrester | 91—56 |
| 628,094 | 7/1899 | Hooper | 74—805 |
| 1,590,166 | 6/1926 | Howard | 74—804 |
| 2,170,951 | 8/1939 | Perry | 74—804 |
| 2,209,201 | 7/1940 | Hill | 74—805 |
| 2,871,831 | 2/1959 | Patin | 230—145 |
| 2,884,815 | 5/1959 | Pittman | 74—804 |
| 3,288,078 | 11/1966 | Monroe et al. | 103—130 |

DONLEY J. STOCKING, *Primary Examiner.*

WILBUR J. GOODLIN, *Assistant Examiner.*

U.S. Cl. X.R.

74—804